United States Patent
He et al.

(10) Patent No.: US 9,733,103 B2
(45) Date of Patent: Aug. 15, 2017

(54) SYSTEM AND DISPLAY ELEMENT FOR DISPLAYING WAYPOINT MARKERS WITH INTEGRATED ALTITUDE CONSTRAINT INFORMATION

(71) Applicant: HONEYWELL INTERNATIONAL INC., Morris Plains, NJ (US)

(72) Inventors: Gang He, Morristown, NJ (US); John G. Suddreth, Cave Creek, AZ (US); Thea L. Feyereisen, Hudson, WI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/002,579

(22) Filed: Jan. 21, 2016

(65) Prior Publication Data
US 2016/0138936 A1 May 19, 2016

Related U.S. Application Data

(60) Continuation of application No. 14/077,266, filed on Nov. 12, 2013, now Pat. No. 9,273,964, which is a
(Continued)

(51) Int. Cl.
*G01C 23/00* (2006.01)
*G01C 21/00* (2006.01)
(Continued)

(52) U.S. Cl.
CPC ........... *G01C 23/005* (2013.01); *G01C 21/00* (2013.01); *G01C 23/00* (2013.01); *G06T 7/70* (2017.01);
(Continued)

(58) Field of Classification Search
CPC ...... G01C 23/00; G01C 23/005; G01C 21/00; G06T 11/20; G06T 7/004; G06T 19/003; G08G 5/0021
See application file for complete search history.

(56) References Cited

U.S. PATENT DOCUMENTS

| 4,021,009 A | 5/1977 | Baker et al. |
| 5,420,582 A | 5/1995 | Kubbat et al. |

(Continued)

FOREIGN PATENT DOCUMENTS

EP 1460384 A2 9/2004

OTHER PUBLICATIONS

EP Search Report for Application No. EP 09176228.6-1236 dated Feb. 17, 2010.
(Continued)

*Primary Examiner* — Redhwan K Manwari
*Assistant Examiner* — Michael Whalen
(74) *Attorney, Agent, or Firm* — Lorenz & Kopf, LLP

(57) ABSTRACT

A flight deck display system for an aircraft includes a processor architecture configured to receive aircraft instrument data, waypoint restriction information, and position data for the aircraft and, based upon the received data, generate image rendering display commands. The system also includes a display element configured to receive the image rendering display commands and, in response thereto, to render a display that includes a perspective view of terrain and at least one waypoint marker corresponding to an approaching waypoint. The waypoint marker includes visually distinguishable characteristics that convey waypoint restriction information (e.g., altitude or airspeed constraint information that governs the waypoint).

5 Claims, 7 Drawing Sheets

Related U.S. Application Data division of application No. 12/275,950, filed on Nov. 21, 2008, now abandoned.

(51) Int. Cl.
  G06T 19/00 (2011.01)
  G08G 5/00 (2006.01)
  G06T 11/20 (2006.01)
  G06T 7/70 (2017.01)

(52) U.S. Cl.
  CPC ............ G06T 11/20 (2013.01); G06T 19/003 (2013.01); G08G 5/0021 (2013.01)

(56) References Cited

U.S. PATENT DOCUMENTS

| | | |
|---|---|---|
| 6,163,743 A | 12/2000 | Bomans et al. |
| 6,505,102 B2 | 1/2003 | Morizet et al. |
| 6,985,091 B2 | 1/2006 | Price |
| 6,985,801 B1 | 1/2006 | Straub et al. |
| 7,010,398 B2 | 3/2006 | Wilkins, Jr. et al. |
| 7,965,202 B1 | 6/2011 | Chiew et al. |
| 8,457,889 B2 | 6/2013 | Feyereisen et al. |
| 2002/0143439 A1 | 10/2002 | Morizet et al. |
| 2004/0160341 A1 | 8/2004 | Feyereisen et al. |
| 2004/0225420 A1 | 11/2004 | Morizet et al. |
| 2005/0182528 A1* | 8/2005 | Dwyer ................... G01C 23/00 701/3 |
| 2006/0250280 A1 | 11/2006 | Chen et al. |
| 2010/0030405 A1 | 2/2010 | He et al. |
| 2016/0140850 A1* | 5/2016 | Feyereisen ........... G08G 5/0047 701/532 |

OTHER PUBLICATIONS

EP Examination Report for Application No. EP 09176228.6-1236 dated Mar. 15, 2010.

EP Examination Report for Application No. EP 09176228.6-1236 dated Oct. 2, 2012.

EP Decision to Grant Application No. EP 09176228.6-1557 / 2189755 dated Feb. 12, 2015.

* cited by examiner

SYSTEM AND DISPLAY ELEMENT FOR DISPLAYING WAYPOINT MARKERS WITH INTEGRATED ALTITUDE CONSTRAINT INFORMATION

CROSS-REFERENCE TO RELATED APPLICATIONS

This application is a continuation of U.S. patent application Ser. No. 14/077,266, filed Nov. 12, 2013, which is a divisional of U.S. patent application Ser. No. 12/275,950, filed Nov. 21, 2008 (now abandoned).

TECHNICAL FIELD

Embodiments of the subject matter described herein relate generally to avionics systems such as flight display systems. More particularly, embodiments of the subject matter relate to a flight deck display system that generates a perspective view of terrain and waypoint markers.

BACKGROUND

Modern flight deck displays for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display.

The lateral view, generally known as a lateral map display, is basically a top-view of the flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate terrain that may impact the aircraft. The perspective view provides a three-dimensional view of the vehicle flight plan and may include one or more of the above-mentioned features that are displayed on the lateral map, including the terrain information.

Altitude data may be displayed as a numerical value that indicates the present altitude in appropriate units, such as feet or meters. An altimeter tape is a graphical element that can be used to display altitude information on a flight deck display element in an easy-to-read manner. An altimeter tape is typically rendered as a small window having a scrolling numerical range dynamically displayed therein. As the altitude of the aircraft changes, the altitude scale of the tape dynamically adjusts such that the current altitude is displayed at a designated location, e.g., near the center of the window. Thus, if the aircraft is flying at a constant altitude of 6500 feet, the altitude scale will appear stationary, with the number 6500 centered in the window. If the aircraft begins to descend, the altitude scale will begin to scroll within the window, the number 6500 will migrate towards the top of the window, and lower elevation numbers will appear near the bottom of the window and begin migrating upwards.

An aircraft might be subject to certain altitude constraints, depending upon the flight plan, the geographic location of the aircraft, etc. For example, an aircraft may be restricted such that it must fly at or above a designated altitude when in one geographical region, at or below a designated altitude when in another geographical region, or between upper and lower altitude boundaries when in yet another geographical region. As another example, when landing, an aircraft will have a target altitude that is associated with the particular landing location.

BRIEF SUMMARY

A flight deck display system, a display element, and related operating methods described herein can be utilized to display a waypoint marker or indicator in a perspective view of terrain, where the waypoint marker conveys altitude constraint or restriction information in a visually perceptible manner. The waypoint marker includes visually distinguishable characteristics that indicate whether the waypoint is associated with an at-or-above constraint, an at-or-below constraint, a between constraint, or a specified altitude constraint.

In accordance with one embodiment, a flight deck display system for an aircraft is provided. The system includes a processor architecture and a display element coupled to the processor architecture. The processor architecture is configured to receive waypoint location data for waypoints, terrain data, aircraft geographic position data for the aircraft, and restriction data for the waypoints. The processor architecture is also configured to generate image rendering display commands based upon the waypoint location data, the terrain data, the restriction data, and the aircraft geographic position data. The display element is configured to receive the image rendering display commands and, in response thereto, to render a perspective view of terrain corresponding to a flight deck viewpoint. In addition, the display element renders a waypoint marker, which corresponds to an approaching waypoint, in the perspective view of terrain. The content and appearance of the waypoint marker are influenced by an aircraft operating parameter restriction for the approaching waypoint.

The above and other aspects may be carried out by an embodiment of a flight deck display element having rendered thereon a perspective view of terrain corresponding to a viewpoint from the flight deck, and having rendered thereon a waypoint marker in the perspective view of terrain. The waypoint marker corresponds to a waypoint in a flight plan, and the waypoint marker includes a primary icon having a first region and a second region. The first region and the second region have different visually distinguishable characteristics that represent whether the waypoint marker is associated with an at-or-above altitude constraint or an at-or-below altitude constraint. The waypoint marker also includes an altitude bar indicative of a nominal altitude corresponding to the waypoint, wherein the perspective view of terrain, the primary icon, and the altitude bar are rendered in a conformal manner relative to the earth.

Also provided is a flight deck display element having rendered thereon a perspective view of terrain corresponding to a viewpoint from the flight deck, and having rendered thereon a waypoint marker in the perspective view of terrain. The waypoint marker corresponds to a waypoint in a flight plan, and the waypoint marker includes a primary icon representing the waypoint and a first altitude bar indicative of a first altitude constraint associated with the waypoint. The perspective view of terrain, the primary icon, and the first altitude bar are rendered in a conformal manner relative to the earth.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
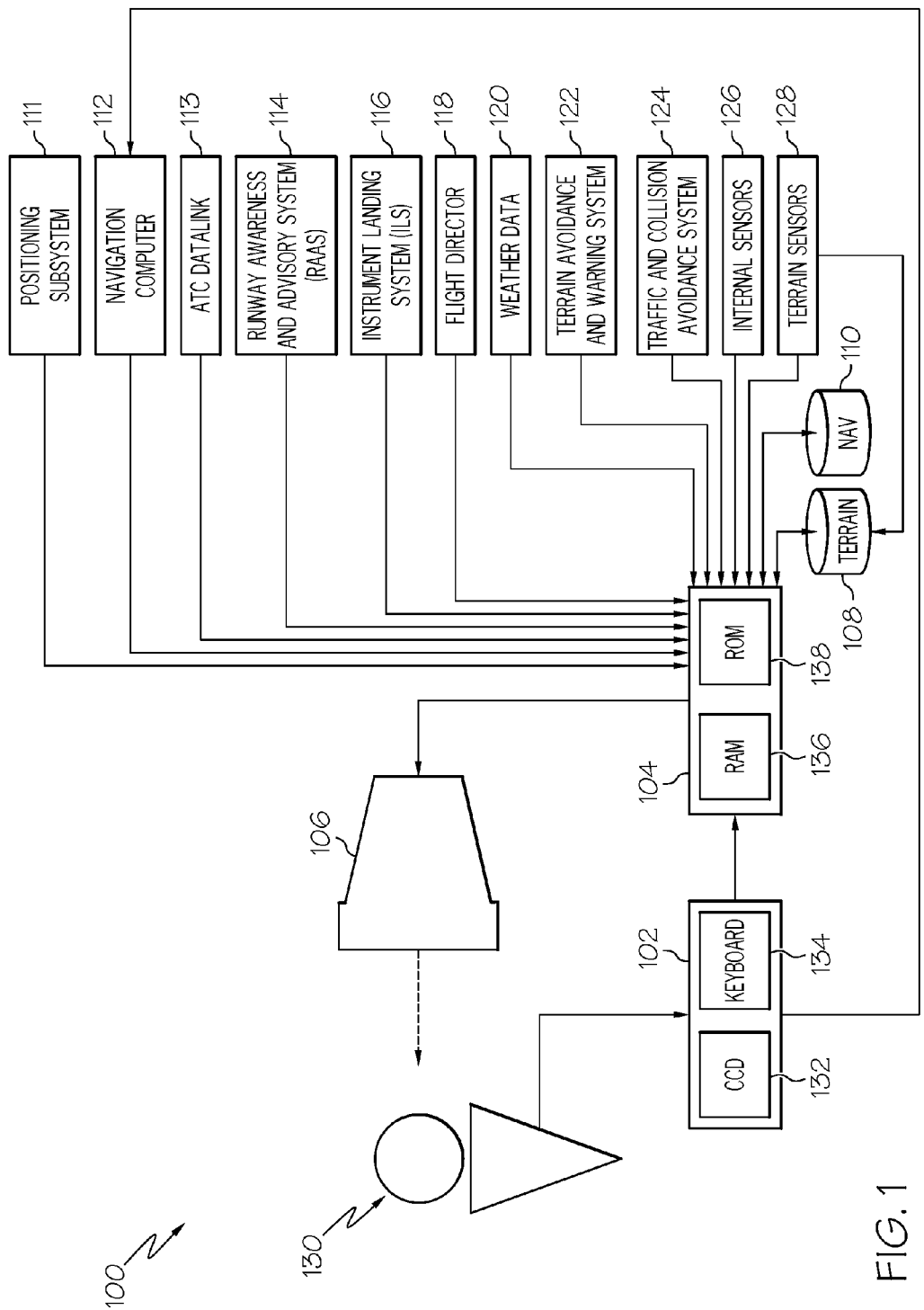
FIG. 1 is a schematic representation of an embodiment of a flight deck display system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

Traditional means of displaying approach procedures for aircraft require the pilot to refer to paper, a log book, a displayed image of paper, or a separate lateral map display. Altitude constraint information, which specifies acceptable descent altitudes based upon the position (e.g., latitude and longitude) of the aircraft, is a particularly important component of these procedures. However, to act on the information with the appropriate display (the altimeter), the pilot has to rehearse, remember, or review the constraint information until the constraint is safely passed. This traditional procedure can be cumbersome and it can create an additional workload burden on the flight crew.

In accordance with the embodiments described herein, a graphically displayed waypoint marker conveys altitude restriction information in a manner that is easy and intuitive to interpret. The waypoint marker is rendered on a perspective view of terrain in a manner that conforms to the earth. The altitude constraint information is conveyed using visually distinguishable characteristics and/or graphical elements of the waypoint marker. Access to terminal approach procedure charts facilitates the gathering of the altitude constraint information, and allows the flight deck display system to present such constraint information at the appropriate time during flight. This display technique enables the pilot to quickly and intuitively view the location of approaching waypoints and any corresponding altitude constraints on a realistic display that emulates the flight deck viewpoint.

FIG. 1 depicts an exemplary flight deck display system 100 that generally includes, without limitation: a user interface 102; a processor architecture 104 coupled to user interface 102; and a display element 106 coupled to processor architecture 104. System 100 may also include, cooperate with, and/or communicate with a number of databases, sources of data, or the like. Moreover, system 100 may include, cooperate with, and/or communicate with a number of external subsystems as described in more detail below. For example, processor architecture 104 may cooperate with one or more of the following components, features, data sources, and subsystems, without limitation: one or more terrain databases 108; one or more navigation databases 110; a positioning subsystem 111; a navigation computer 112; an air traffic control (ATC) datalink 113; a runway awareness and advisory system (RAAS) 114; an instrument landing system (ILS) 116; a flight director 118; a source of weather data 120; a terrain avoidance and warning system (TAWS) 122; a traffic and collision avoidance system (TCAS) 124; one or more inertial sensors 126; and one or more terrain sensors 128.

User interface 102 is in operable communication with processor architecture 104 and is configured to receive input from a user 130 (e.g., a pilot) and, in response to the user input, supply command signals to processor architecture 104. User interface 102 may be any one, or combination, of various known user interface devices including, but not limited to, a cursor control device (CCD) 132, such as a mouse, a trackball, or joystick, one or more buttons, switches, or knobs. In the depicted embodiment, user interface 102 includes CCD 132 and a keyboard 134. The user 130 manipulates CCD 132 to, among other things, move cursor symbols that might be rendered at various times on display element 106, and the user 130 may manipulate keyboard 134 to, among other things, input textual data. As depicted in FIG. 1, user interface 102 may also be utilized to enable user interaction with navigation computer 112, the flight management system, and/or other features and components of the aircraft.

Processor architecture 104 may utilize one or more known general-purpose microprocessors or an application specific processor that operates in response to program instructions. In the depicted embodiment, processor architecture 104 includes or communicates with onboard RAM (random access memory) 136, and onboard ROM (read only memory) 138. The program instructions that control processor architecture 104 may be stored in either or both RAM 136 and ROM 138. For example, the operating system software may be stored in ROM 138, whereas various operating mode software routines and various operational parameters may be stored in RAM 136. It will be appreciated that this is merely exemplary of one scheme for storing operating system software and software routines, and that various other storage schemes may be implemented. It will also be appreciated that processor architecture 104 may be implemented using various other circuits, not just a programmable processor. For example, digital logic circuits and analog signal processing circuits could also be used.

Processor architecture 104 is in operable communication with terrain database 108, navigation database 110, and display element 106, and is coupled to receive various types of data, information, commands, signals, etc., from the various sensors, data sources, instruments, and subsystems described herein. For example, processor architecture 104 is suitably configured to obtain and process avionics-related data as needed to generate a graphical and perspective (three dimensional) representation of terrain and waypoint markers having the features and characteristics described below with reference to FIGS. 3-9.

In certain embodiments, processor architecture 104 is configured to respond to inertial data obtained by inertial sensors 126 to selectively retrieve terrain data from terrain database 108 or terrain sensor 128 and navigation data from navigation database 110. Processor architecture 104 can also supply appropriate display commands to display element 106, so that the retrieved terrain and navigation data are appropriately displayed on display element 106. Processor architecture 104 is further configured to receive airspeed, altitude, waypoint, and geographic position data for the aircraft and, based upon that data, generate image rendering commands associated with the display of terrain and waypoint markers (that include graphical representations of position-dependent altitude constraint information). The preferred manner in which the waypoints and constraint data are displayed on display element 106 will be described in more detail further below.

Display element 106 is used to display various images and data, in both a graphical and a textual format, and to supply visual feedback to the user 130 in response to the user input commands supplied by the user 130 to user interface 102. It will be appreciated that display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. Display element 106 may additionally be based on a panel mounted display, a HUD projection, or any known technology. In an exemplary embodiment, display element 106 includes a panel display, and display element 106 is suitably configured to receive image rendering commands from processor architecture 104 and, in response thereto, display element 106 renders a perspective view of terrain corresponding to a flight deck viewpoint, along with waypoint markers that correspond to approaching waypoints. To provide a more complete description of the operating method that is implemented by system 100, a general description of display element 106 and various graphical features rendered thereon will provided below with reference to FIGS. 3-9.

As FIG. 1 shows, processor architecture 104 is in operable communication with the source of weather data 120, TAWS 122, and TCAS 124, and is additionally configured to generate, format, and supply appropriate display commands to display element 106 so that the avionics data, weather data 120, data from TAWS 122, data from TCAS 124, and data from the previously mentioned external systems may also be selectively rendered in graphical form on display element 106. The data from TCAS 124 can include Automatic Dependent Surveillance Broadcast (ADS-B) messages.

Terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in terrain database 108 can be pre-loaded by external data sources or provided in real-time by terrain sensor 128. Terrain sensor 128 provides real-time terrain data to processor architecture 104 and/or terrain database 108. In one embodiment, terrain data from terrain sensor 128 is used to populate all or part of terrain database 108, while in another embodiment, terrain sensor 128 provides information directly, or through components other than terrain database 108, to processor architecture 104.

In another embodiment, terrain sensor 128 can include visible, low-light TV, infrared, lidar, or radar-type sensors that collect and/or process terrain data. For example, terrain sensor 128 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in terrain database 108 or processed for display on display element 106.

In one embodiment, the terrain data provided to processor architecture 104 is a combination of data from terrain database 108 and terrain sensor 128. For example, processor architecture 104 can be programmed to retrieve certain types of terrain data from terrain database 108 and other certain types of terrain data from terrain sensor 128. In one embodiment, terrain data retrieved from terrain sensor 128 can include moveable terrain, such as mobile buildings and systems. This type of terrain data is better suited for terrain sensor 128 to provide the most up-to-date data available. For example, types of information such as waterbody information and geopolitical boundaries can be provided by terrain database 108. When terrain sensor 128 detects, for example, a waterbody, the existence of such can be confirmed by terrain database 108 and rendered in a particular color such as blue by processor architecture 104.

Navigation database 110 includes various types of navigation-related data stored therein. In preferred embodiments, navigation database 110 is an onboard database that is carried by the aircraft. The navigation-related data include various flight plan related data such as, for example, and without limitation: waypoint location data for geographical waypoints; restricted, constrained, or target altitude values (such as target altitudes, upper altitude limits, or lower altitude limits) corresponding to geographical waypoints; distances between waypoints; track between waypoints; restricted, constrained, or target airspeed values (such as target airspeeds, upper airspeed limits, or lower airspeed limits) corresponding to geographical waypoints; data related to different airports; navigational aids; obstructions; special use airspace; restricted, constrained, or target altitude/airspeed values corresponding to special use airspace; political boundaries; communication frequencies; and aircraft approach information. In one embodiment, combinations of navigation-related data and terrain data can be displayed. For example, terrain data gathered by terrain sensor 128 and/or terrain database 108 can be displayed with navigation data such as waypoints, airports, etc. from navigation database 110, superimposed thereon. As described in more detail below, processor architecture 104 may be suitably configured to access position-dependent and/or geographically correlated altitude or airspeed constraint information from navigation database 110, and process such constraint information for display with one or more approaching waypoint markers in a graphical representation of terrain.

Although terrain database 108 and navigation database 110 are, for clarity and convenience, shown as being stored separate from processor architecture 104, all or portions of either or both of these databases 108, 110 could be loaded into the onboard RAM 136, stored in ROM 138, or integrally formed as part of processor architecture 104. Terrain database 108 and navigation database 110 could also be part of a device or system that is physically separate from system 100.

Positioning subsystem 111 is suitably configured to obtain position data for the aircraft. In practice, positioning subsystem 111 monitors the current position of the aircraft in real-time, and the real-time position data can be used by one or more other subsystems, processing modules, or equipment on the aircraft (e.g., navigation computer 112, RAAS 114, ILS 116, flight director 118, TAWS 122, or TCAS 124). In certain embodiments, positioning subsystem 111 is realized using global positioning system (GPS) technologies that are commonly deployed in avionics applications. Thus, the position data obtained by positioning subsystem 111 may represent the latitude and longitude of the aircraft in an ongoing and continuously updated manner.

The avionics data that is supplied from inertial sensors 126 includes data representative of the state of the aircraft such as, for example, aircraft speed, altitude, and heading. Inertial sensors 126 can include MEMS-based, ADHRS-related, or any other type of inertial sensor. Inertial sensors 126 may include at least one sensor that is suitably configured to obtain altitude data for the aircraft, where the altitude data represents the current real-time altitude of the aircraft. As understood by those familiar with avionics instruments, the altitude data is preferably updated in a continuous and ongoing manner.

The weather data 120 supplied to processor architecture 104 is representative of at least the location and type of various weather cells. The data supplied from TCAS 124 includes data representative of other aircraft in the vicinity, which may include, for example, speed, direction, altitude, and altitude trend. In a preferred embodiment, processor architecture 104, in response to the TCAS data, supplies appropriate display commands to display element 106 such that a graphic representation of each aircraft in the vicinity is displayed on display element 106. TAWS 122 supplies data representative of the location of terrain that may be a threat to the aircraft. Processor architecture 104, in response to the TAWS data, preferably supplies appropriate display commands to display element 106 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to processor architecture 104 for display on display element 106. In the depicted embodiment, these external systems include a flight director 118, an instrument landing system (ILS) 116, a runway awareness and advisory system (RAAS) 114, and a navigation computer 112. Flight director 118, as is generally known, supplies command data representative of commands for piloting the aircraft in response to flight crew entered data, or various inertial and avionics data received from external systems. The command data supplied by flight director 118 may be supplied to processor architecture 104 and displayed on display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. ILS 116 onboard the aircraft receives these signals and supplies appropriate data to the processor for display of, for example, an ILS feather (not shown in FIG. 1) on the display element 106. The ILS feather represents two signals, a localizer signal that is used to provide lateral guidance, and a glide slope signal that is used for vertical guidance.

RAAS 114 provides improved situational awareness to help lower the probability of runway incursions by providing timely aural advisories to the flight crew during taxi, takeoff, final approach, landing and rollout. RAAS 114 uses GPS data to determine aircraft position and compares aircraft position to airport location data stored in navigation database 110. Based on these comparisons, RAAS 114, if necessary, issues appropriate aural advisories. Aural advisories, which may be issued by RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

Navigation computer 112 is used, among other things, to allow the user 130 to program a flight plan from one destination to another. Navigation computer 112 may be in operable communication with flight director 118. As was mentioned above, flight director 118 may be used to automatically fly, or assist the user 130 in flying, the programmed route. Navigation computer 112 is in operable communication with various databases including, for example, terrain database 108, and navigation database 110. Processor architecture 104 may receive the programmed flight plan data from navigation computer 112 and cause the programmed flight plan, or at least portions thereof, to be displayed on display element 106.

ATC datalink 113 is utilized to provide air traffic control data to system 100, preferably in compliance with known standards and specifications. Using ATC datalink, processor architecture 104 can receive air traffic control data from ground based air traffic controller stations and equipment. In turn, system 100 can utilize such air traffic control data as needed.

Figure 2:
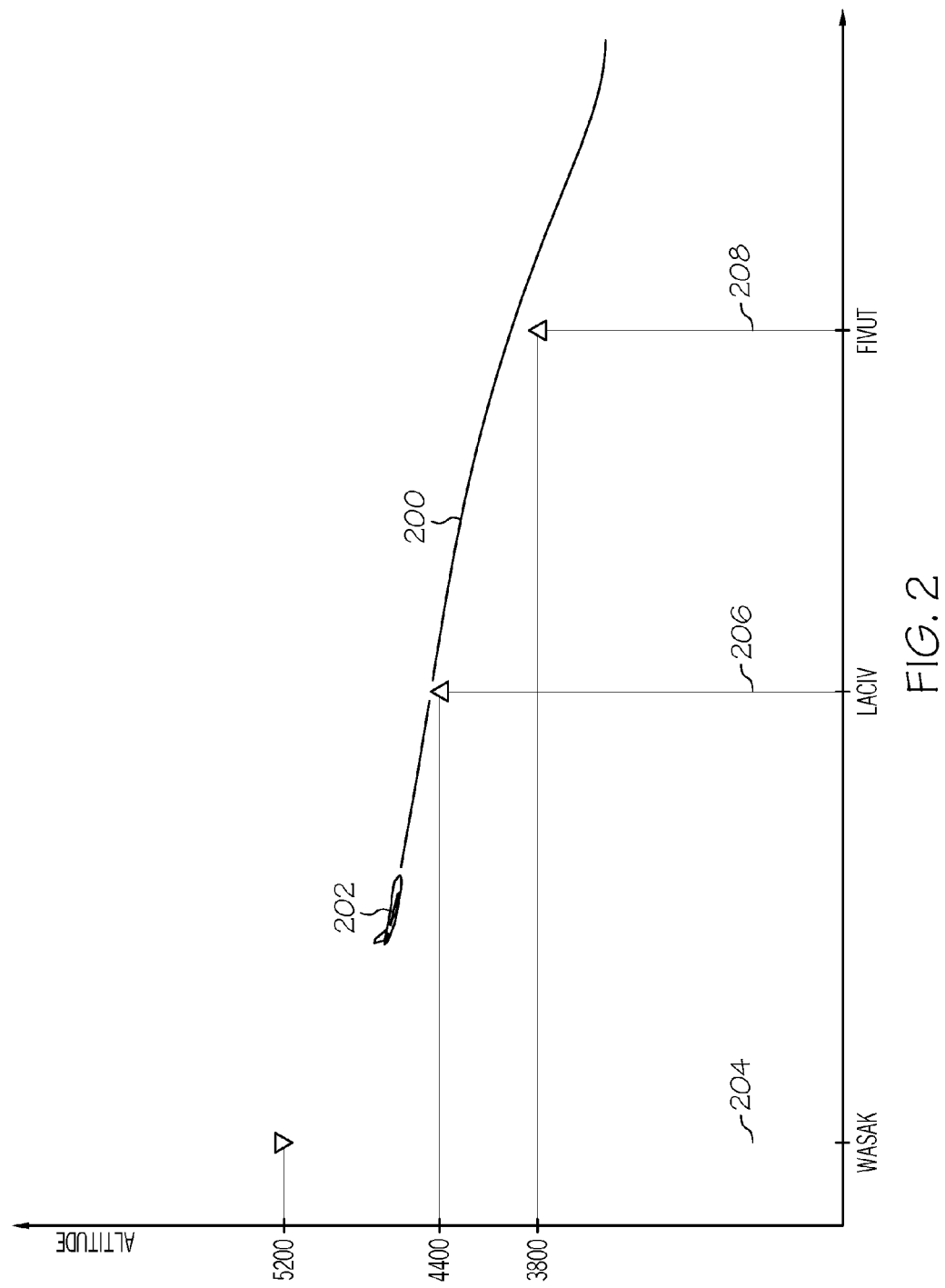
FIG. 2 is a simplified chart that illustrates a flight plan of an aircraft relative to three geographical waypoints.

FIG. 2 is a simplified chart that illustrates a flight plan 200 of an aircraft 202 relative to three geographical waypoints. The vertical axis represents altitude in feet, and the horizontal axis represents lateral position or distance, and the chart depicts aircraft 202 in a descent pattern. For this example, each geographical waypoint corresponds to a stationary reference point, which may in turn correspond to a designated latitude and longitude, a designated set of GPS coordinates, or the like. FIG. 2 shows that aircraft 202 has already passed a first geographical waypoint 204 identified by the label WASAK, and that aircraft 202 is approaching a second geographical waypoint 206 identified by the label LACIV. In accordance with the illustrated flight plan 200, aircraft 202 will ultimately pass a third geographical waypoint 208 identified by the label FIVUT. A given geographical waypoint, region, or zone may be associated with an altitude (or airspeed) restriction, constraint, target, clearance, guideline, regulation, or limitation, which may be dictated or influenced by factors such as, without limitation: the particular flight plan; the departure airport; the destination airport; the class of aircraft; whether the aircraft is flying in special use or restricted airspace; whether the aircraft is flying in an altitude-regulated airway; or the like.

A given geographical waypoint or region may be associated with an appropriate type of altitude or airspeed constraint. For example, a target altitude or altitude range may be specified to ensure that the aircraft is flying at a tightly controlled altitude. Alternatively, a waypoint or region may be governed by an upper altitude limit (i.e., an "at-or-below" constraint) or a lower altitude limit (i.e., an "at-or-above" constraint) for aircraft. A waypoint or region may instead be governed by a "between" constraint that designates an upper altitude limit and a lower altitude limit. Moreover, a waypoint or region may be governed by a specified altitude constraint (i.e., an "at" constraint) having an associated target altitude. For the example depicted in FIG. 2, the first geographical waypoint 204 has an at-or-below constraint of 5200 feet, the second geographical waypoint 206 has an at-or-above constraint of 4400 feet, and the third geographical waypoint 208 has an at-or-above constraint of 3800 feet. Similarly, a given waypoint may have an associated airspeed constraint assigned thereto (e.g., maximum airspeed, minimum airspeed, target airspeed, an airspeed range, etc.).

In operation, a flight deck display system as described herein is suitably configured to process altitude data, terrain data, and geographic position data for the aircraft, and obtain position-dependent restriction or constraint data based upon the position data. In response to the altitude data, the terrain data, and the position-dependent restriction/constraint data, the display system can generate and display an appropriately formatted perspective (three dimensional) display of terrain on its display element. Notably, this perspective display also includes one or more graphical waypoint markers rendered in a conformal manner, where an approaching waypoint marker is rendered with visually distinguishable characteristics that identify any altitude constraints associated with that waypoint.

Figure 3:
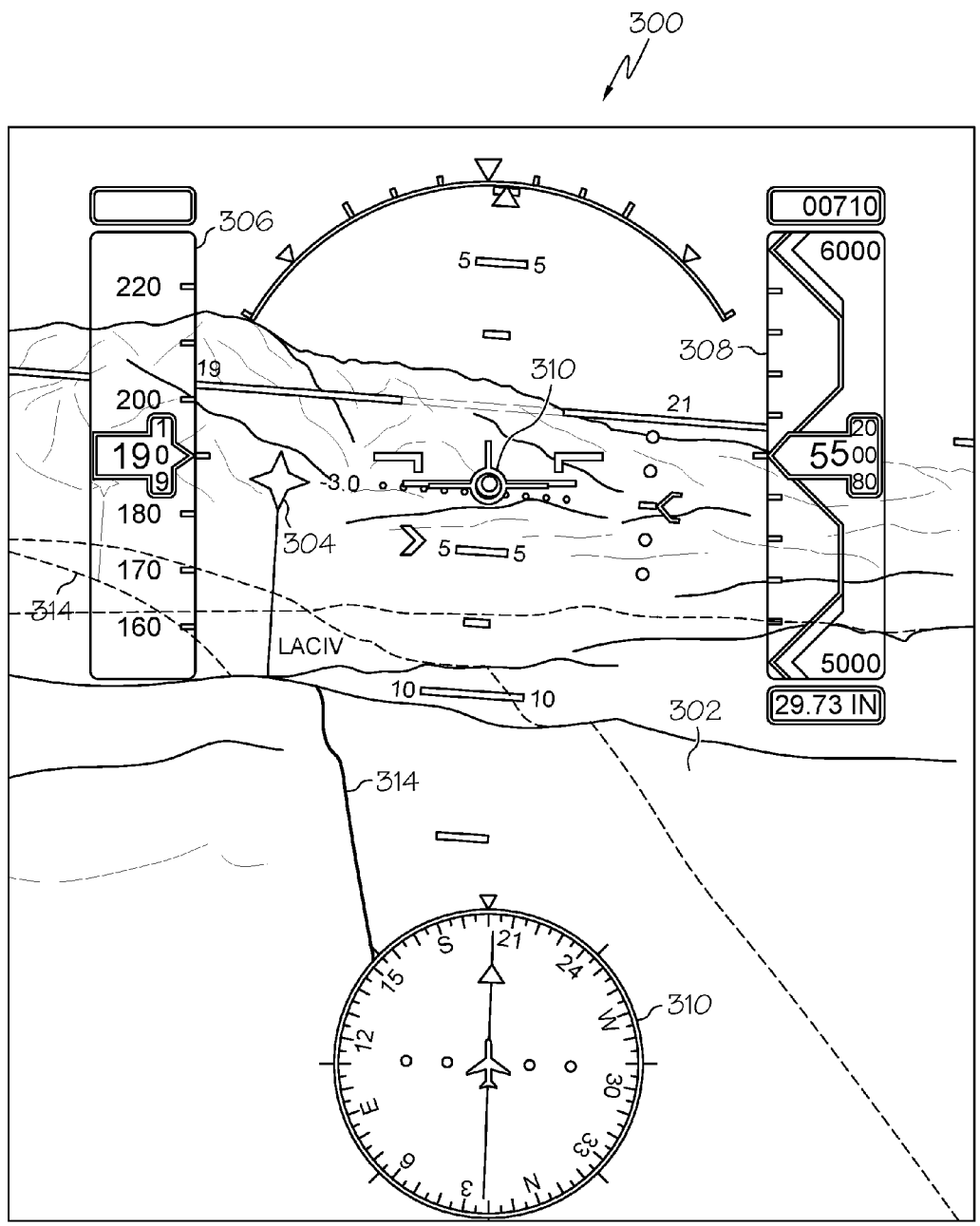
FIG. 3 is a graphical representation of an exemplary screen shot that can be rendered on a flight deck display element.

FIG. 3 is a graphical representation of an exemplary screen shot 300 that can be rendered on a flight deck display element. It should be appreciated that this screen shot 300 represents the state of a dynamic display frozen at one particular time, and that the flight deck display element can be continuously refreshed in response to the current flight status, environmental conditions, location of the aircraft, etc. This particular screen shot 300 includes several primary features that are graphically rendered. These features include, without limitation: a perspective view of terrain 302; a waypoint marker 304; an airspeed tape 306; an altimeter tape 308; a compass or horizontal situation indicator 310; a reference marker 312; and flight plan indicia 314. In practice, screen shot 300 may include any number of additional graphical elements rendered on the flight deck display element, e.g., flight data, numerical information, pilot guidance elements, trend data, and the like. For the sake of clarity, simplicity, and brevity, such additional graphical elements are not shown or described here.

Figure 4:
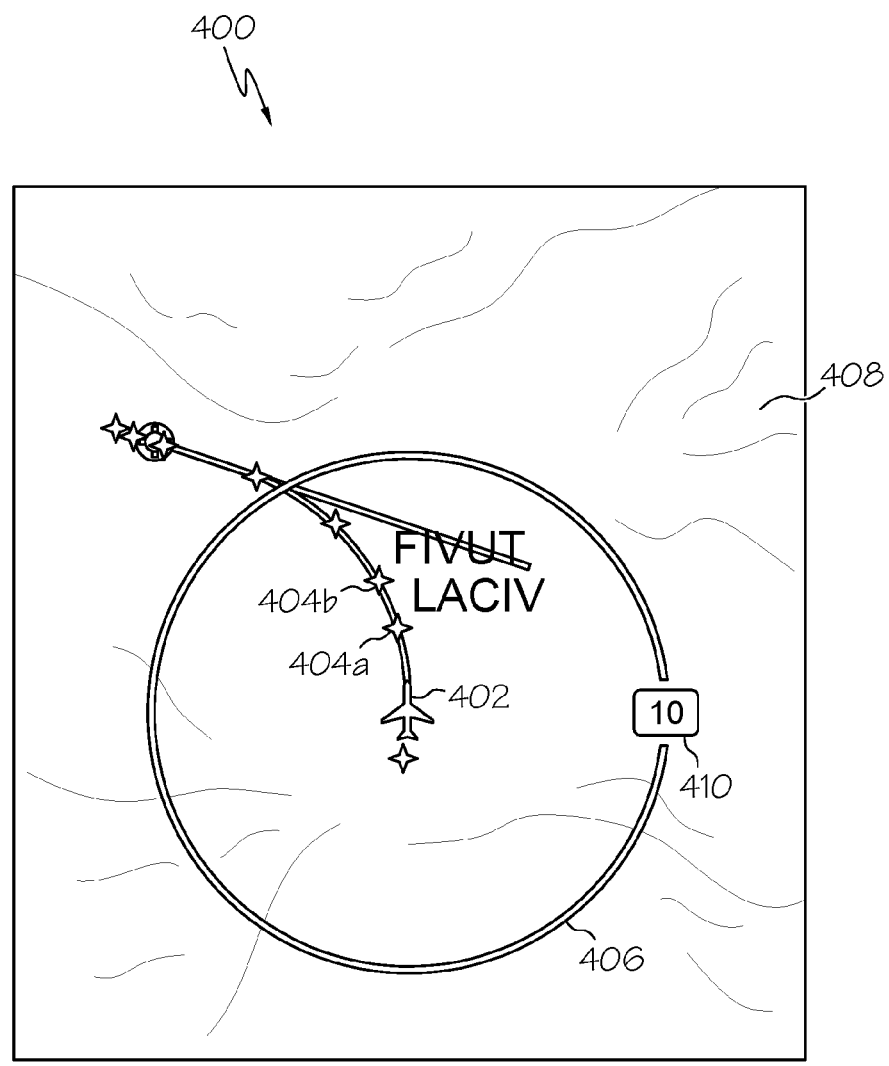
FIG. 4 is a schematic representation of an embodiment of a graphical lateral situation display element.

A flight deck display system may also render a lateral situation display element concurrently with the main perspective display. In this regard, FIG. 4 is a schematic representation of an embodiment of such a graphical lateral situation display element 400. Lateral situation display element 400 can display information based on data from a number of sources, including the various sensors, sources, and subsystems described above with reference to FIG. 1. The lateral situation display element 400 includes a top-view aircraft symbol 402, at least portion of a flight plan represented by one or more waypoint symbols 404, and one or more range rings 406. Lateral situation display element 400 also preferably includes various map features including, but not limited to, a lateral two-dimensional view of terrain 408 below the flight plan, political boundaries, and navigation aids. Range rings 406 may be used to indicate sequential ranges, such as fixed distance or time ranges needed to travel from the current position indicated by the top-view aircraft symbol 402 to another position on the terrain 408, or any other information that may be useful to a pilot. In the illustrated embodiment, the range rings 406 indicate distances from the aircraft symbol 402. The range ring 406 includes a range indicator 410, which displays the lateral distance from the present position to the position that corresponds to the range ring 406 (e.g., 10 nautical miles).

The depicted state of lateral situation display element 400 corresponds to the depicted state of screen shot 300 in FIG. 3. In other words, the aircraft is descending and approaching the geographical waypoint labeled LACIV, which is rendered on lateral situation display element 400 as a corresponding waypoint symbol 404a. The next waypoint (labeled FIVUT) in the designated flight plan is indicated by waypoint symbol 404b. As depicted in FIG. 4, any number of waypoint symbols 404 may be associated with the particular flight plan. The combination of the three dimensional display (e.g., screen shot 300) and lateral situation display element 400 provides useful and intuitive information to the flight crew in a simple graphical manner.

Referring again to FIG. 3, terrain 302 is rendered in a perspective or three dimensional view that corresponds to a flight deck viewpoint. In other words, terrain 302 is displayed in a graphical manner that simulates the vantage point of a person in the cockpit of the aircraft. Thus, features of terrain 302 are displayed in a conformal manner, relative to the earth. For example, the relative elevations and altitudes of features in terrain 302 are displayed in a virtual manner that emulates reality. Moreover, as the aircraft navigates (e.g., turns, ascends, descends, rolls, etc.), the graphical representation of terrain 302 and other features of the perspective display can shift to provide a continuously updated virtual representation for the flight crew. It should be appreciated that the perspective view associated with a display need not always include a perspective view of terrain 302. For example, in the absence of terrain data, the perspective view of the display may appear flat, blank, or otherwise void of conformal terrain graphics. Nonetheless, waypoint markers can still be rendered in a perspective view and conformal context. In other words, waypoints and their associated altitude constraint information can be placed in a conformal geographic context with or without graphical terrain features concurrently displayed therewith.

In preferred embodiments, waypoint markers (such as waypoint marker 304) are also rendered in the perspective view of terrain 302 in a conformal manner. Other displayed items, features, and elements, such as flight plan indicia 314, may also be rendered on terrain 302 in a conformal manner. In other words, waypoint marker 304 and flight plan indicia 314 are displayed in a three dimensional manner that corresponds to the actual contour and geographic location of the corresponding terrain. For example, waypoint marker 304 is graphically displayed in its specified geographic location, and in proper relation to other displayed features of terrain 302. In preferred embodiments, waypoint marker 304 is graphically displayed at a specified altitude, and in proper relation to other displayed features of terrain 302. This aspect of is described in more detail below.

Figure 5:
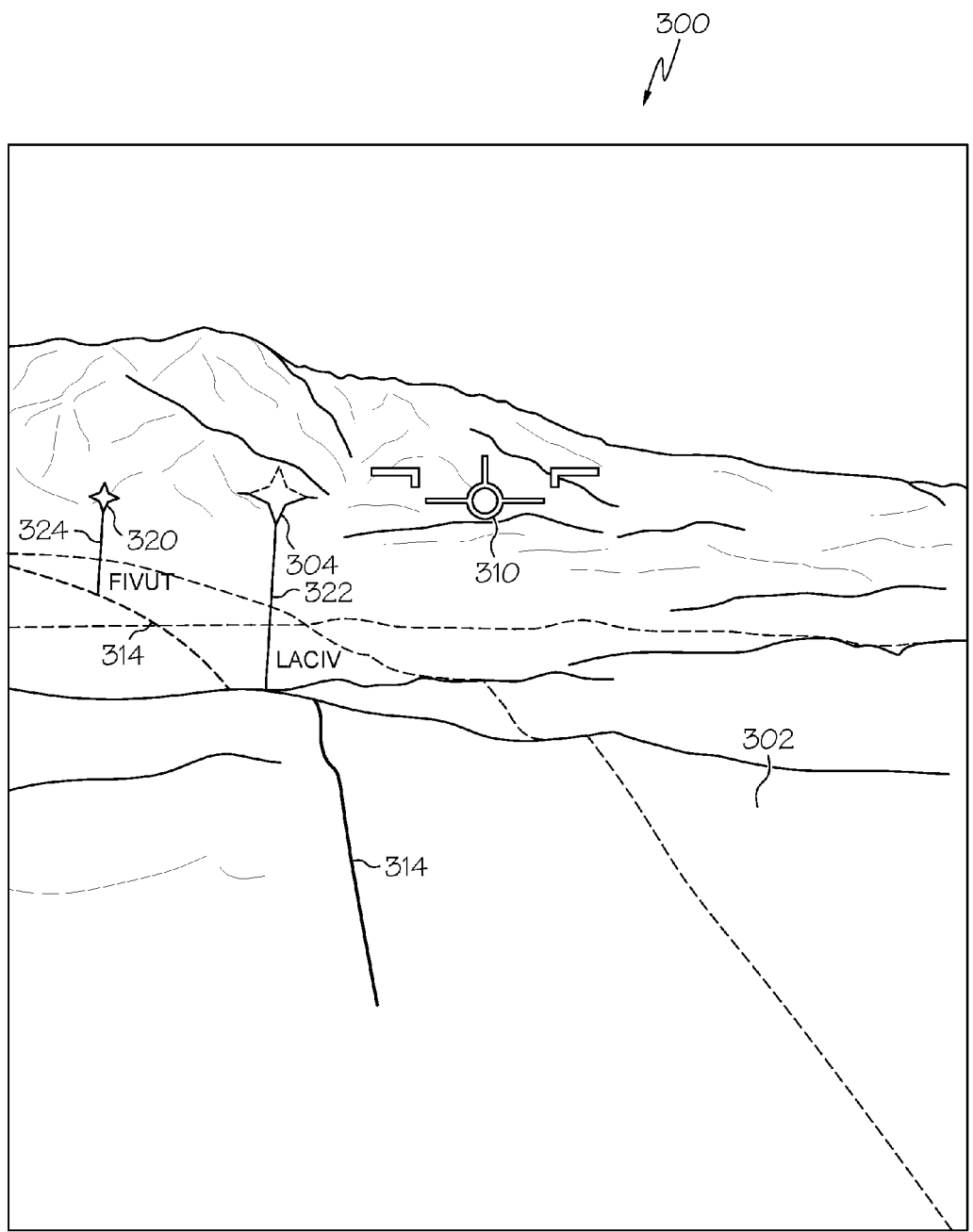
FIG. 5 is a simplified graphical representation of the screen shot depicted in FIG. 3.

For clarity and ease of description, FIG. 5 depicts a simplified graphical representation of screen shot 300. In particular, some of the displayed elements shown in FIG. 3 have been removed to better show the waypoint markers and flight plan indicia, which might otherwise be obscured or overlapped by elements that remain displayed "on top" in the perspective display. For example, FIG. 5 shows another waypoint marker 320 that is hidden from view in FIG. 3 due to the rendering of airspeed tape 306. In FIG. 5, waypoint marker 304 corresponds to the geographical waypoint labeled LACIV, and waypoint marker 320 corresponds to the geographical waypoint labeled FIVUT. For this example, LACIV is the immediately approaching waypoint for the aircraft, and FIVUT is the waypoint immediately following LACIV in the designated flight plan. Notably, waypoint marker 304 may be joined to flight plan indicia 314 using a displayed stem or stalk 322. Similarly, waypoint marker 320 may be joined to flight plan indicia 314 using a displayed stem or stalk 324. Each stalk "pins" its waypoint marker to the geographic location of the corresponding waypoint. Moreover, the displayed height of each stalk might correspond to an altitude constraint or restriction associated with the respective waypoint. In this regard, FIG. 5 depicts a scenario where the aircraft is in a descent pattern and, therefore, waypoint marker 304 is displayed at a higher elevation than waypoint marker 320. It should be noted that a waypoint need not have any constraints associated with it. If a waypoint is not subject to an altitude constraint, then it may have an arbitrary altitude value associated therewith for purposes of positioning the waypoint marker on the perspective display. Alternatively, the system may be configured to generate a graphical waypoint marker in the current display (regardless of whether or not an altitude constraint applies) when the aircraft is within a certain distance from the waypoint.

The flight deck display system may also change the appearance of the waypoint markers 304/320, the stalks 322/324, and/or the flight plan indicia 314 to convey additional information to the flight crew. For example, certain displayed elements may be rendered using a distinguishable color, font, size, texture, transparency, or the like, and the distinguishable characteristic (or characteristics) may have contextually relevant meaning. Certain embodiments employ a color scheme associated with auto pilot control. In this regard, an approaching waypoint marker and its stalk can be displayed in a first color (such as magenta) to indicate that the auto pilot subsystem is controlling the aircraft to satisfy the particular altitude constraint at that geographical waypoint or position. Moreover, the segment of flight plan indicia 314 leading to the approaching waypoint marker can also be displayed in the first color. Thus, waypoint marker 304, stalk 322, and the segment of flight plan indicia 314 leading to waypoint marker 304 may be magenta colored to convey that the auto pilot subsystem is directing the aircraft toward the LACIV waypoint (FIG. 5 depicts these magenta colored items using thick solid line). A second color (such as cyan or white) may be used to indicate an upcoming waypoint to which the auto pilot subsystem is not currently controlling. In this regard, waypoint marker 320, stalk 324, and the associated segment of flight plan indicia 314 (for the waypoint FIVUT) may be displayed using white or cyan to convey that the auto pilot subsystem is not yet (but soon will be) directing the aircraft toward the FIVUT waypoint. After the aircraft passes the LACIV waypoint, the graphical features associated with the FIVUT waypoint will change from white/cyan to magenta.

A waypoint marker can be suitably rendered such that it conveys an altitude restriction, constraint, regulation, or limitation for its respective waypoint. An altitude constraint or restriction may be designated for a respective position, region, geographical waypoint, airspace boundary, airway, or the like. Depending upon the implementation and deployment of the host system, the data representing the altitude constraints may be included or otherwise associated with the onboard flight plan. Alternatively, the data representing the altitude constraints could be provided to the onboard system via, for example, ATC datalink 113 (see FIG. 1) for imbedding or incorporating into the onboard flight plan.

The system described here contemplates at least four types of altitude constraints, although an embodiment of the system may handle more or less than four different types. The four constraints described here are "at-or-above," "at-or-below," "between," and "specified altitude" (or "at") constraints. An at-or-above constraint is associated with a lower altitude limit at that particular waypoint. An at-or-below constraint is associated with an upper altitude limit at that particular waypoint. A between constraint is associated with a specified altitude range, i.e., a designated upper altitude limit and a designated lower altitude limit for the waypoint. A specified altitude constraint indicates a target altitude (or a very restricted altitude range) for the waypoint.

In preferred embodiments, the content and/or appearance of a waypoint marker might be influenced by an altitude restriction for the corresponding waypoint. For example, waypoint markers can be rendered using visually distinguishable characteristics associated with the different types of altitude constraints. The visually distinguishable characteristics can be specified such that the user can quickly and easily interpret the display to determine whether an approaching waypoint is governed by an altitude constraint and, if so, which type of altitude constraint applies (e.g., at-or-above, at-or-below, between, or specified altitude). In this regard, the different visually distinguishable characteristics may correspond to any of the following characteristics, individually or in any combination thereof: different colors; different brightness; different transparency levels; different translucency levels; different line patterns; different line thickness; different shapes; different sizes; different flicker patterns; different focus levels; different sharpness levels; different clarity levels; and orientation/alignment of the waypoint marker (for example, relative to the flight path or relative to the user viewpoint).

Figure 6:
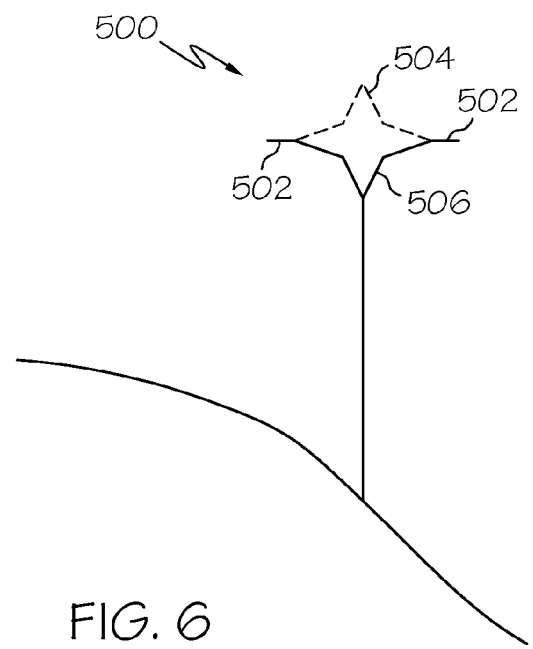
FIG. 6 is a schematic representation of a waypoint marker associated with an at-or-above constraint.

For the embodiment illustrated in FIG. 5, the LACIV waypoint is subject to an at-or-above altitude constraint and, therefore, waypoint marker 304 is rendered in manner that indicates the at-or-above constraint. Similarly, FIG. 6 is a schematic representation of a waypoint marker 500 associated with an at-or-above constraint for the waypoint labeled LACIV. As mentioned previously, waypoint marker 500 is preferably rendered in the perspective view of terrain (not shown in FIG. 6) in a conformal manner. Waypoint marker 500 indicates the target altitude for the at-or-above constraint, i.e., the lower altitude limit. For this embodiment, waypoint marker 500 includes an altitude bar 502 that is displayed at the target altitude for the at-or-above constraint. In this manner, altitude bar 502 is indicative of the nominal (target) altitude corresponding to the waypoint. Although not always required, altitude bar 502 is preferably positioned at or near the center of waypoint marker 500. In some embodiments, the target altitude can be displayed in numerical form at or near altitude bar 502 or within waypoint marker 500.

Waypoint marker 500 represents the primary icon associated with the LACIV waypoint. This primary icon has a first region 504 (e.g., the upper region in FIG. 5) and a second region 506 (e.g., the lower region in FIG. 5). First region 504 and second region 506 have different visually distinguishable characteristics that represent the at-or-above nature of the altitude constraint. In FIG. 5, the dashed line portion of waypoint marker 500 is associated with first region 504, and the solid line portion of waypoint marker 500 is associated with second region 506. Waypoint marker 500 or selected portions thereof can be rendered as a "solid" form or in an "outlined" form (as depicted in FIG. 5). The outline format may be desirable to minimize the amount of terrain that is obscured by waypoint marker 500.

In certain preferred embodiments, first region 504 of waypoint marker 500 is rendered with graphical characteristics that make it relatively subdued, and second region 506 of waypoint marker 500 is rendered with graphical characteristics that make it relatively highlighted. This subdued/highlighted scheme intuitively indicates that altitudes above altitude bar 502 are permitted or clear, while altitudes below altitude bar 502 are blocked or prohibited. In one practical embodiment, first region 504 is rendered in a relatively transparent or translucent manner, while second region 506 is rendered in a relatively opaque or solid manner. In another embodiment, first region 504 is rendered in a relatively dim manner, while second region 506 is rendered in a relatively bright manner. As mentioned above, the manner in which first region 504 and second region 506 are distinctively rendered may vary from one embodiment to another.

Figure 7:
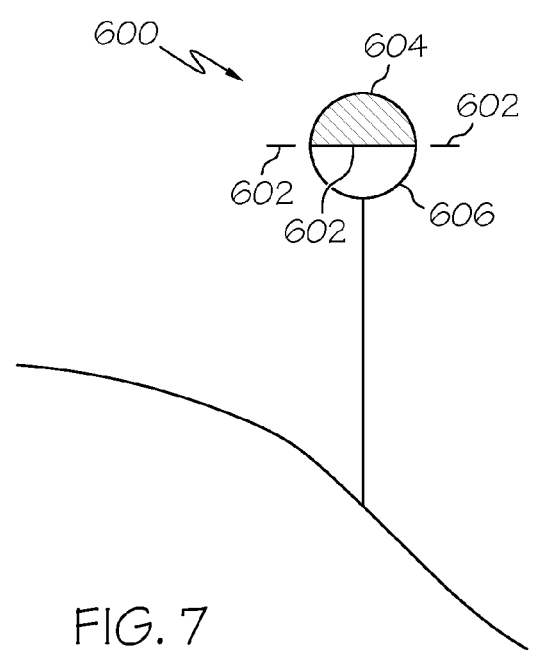
FIG. 7 is a schematic representation of a waypoint marker associated with an at-or-below constraint.

FIG. 7 is a schematic representation of a waypoint marker 600 associated with an at-or-below constraint for a waypoint. Waypoint marker 600 indicates the target altitude for the at-or-below constraint, i.e., the upper altitude limit. For this embodiment, waypoint marker 600 includes an altitude bar 602 that is displayed at the target altitude for the at-or-below constraint. In this manner, altitude bar 602 is indicative of the nominal (target) altitude corresponding to the waypoint. Although not always required, altitude bar 602 is preferably positioned at or near the center of waypoint marker 600. In some embodiments, the target altitude can be displayed in numerical form at or near altitude bar 602 or within waypoint marker 600.

Waypoint marker 600 represents the primary icon associated with the waypoint. This primary icon has a first region 604 (e.g., the upper region in FIG. 6) and a second region 606 (e.g., the lower region in FIG. 6). First region 604 and second region 606 have different visually distinguishable characteristics that represent the at-or-below nature of the altitude constraint. In FIG. 6, the cross hatched portion of waypoint marker 600 is associated with first region 604, and the remaining portion of waypoint marker 600 is associated with second region 606. First region 604 of waypoint marker 600 can be rendered as a "solid" form, and second region 606 can be rendered in an "outlined" form (as depicted in FIG. 6). The outline format may be desirable to minimize the amount of terrain that is obscured by waypoint marker 600.

In certain preferred embodiments, first region 604 of waypoint marker 600 is rendered with graphical characteristics that make it relatively highlighted, and second region 606 of waypoint marker 600 is rendered with graphical characteristics that make it relatively subdued. This subdued/highlighted scheme intuitively indicates that altitudes below altitude bar 602 are permitted or clear, while altitudes above altitude bar 602 are blocked or prohibited. In one practical embodiment, first region 604 is rendered in a relatively opaque or solid manner, while second region 606 is rendered in a relatively transparent or translucent manner. In another embodiment, first region 604 is rendered in a relatively bright manner, while second region 606 is rendered in a relatively dim manner. As mentioned above, the manner in which first region 604 and second region 606 are distinctively rendered may vary from one embodiment to another.

Figure 8:
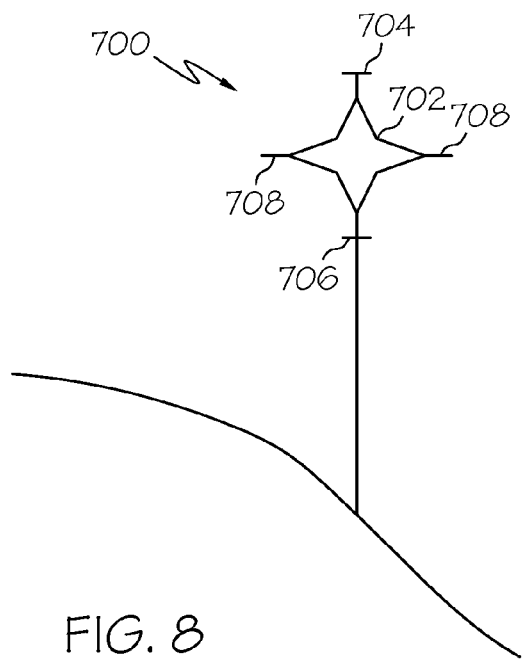
FIG. 8 is a schematic representation of a waypoint marker associated with a between constraint, as viewed when the aircraft is relatively far away from the waypoint.
Figure 9:
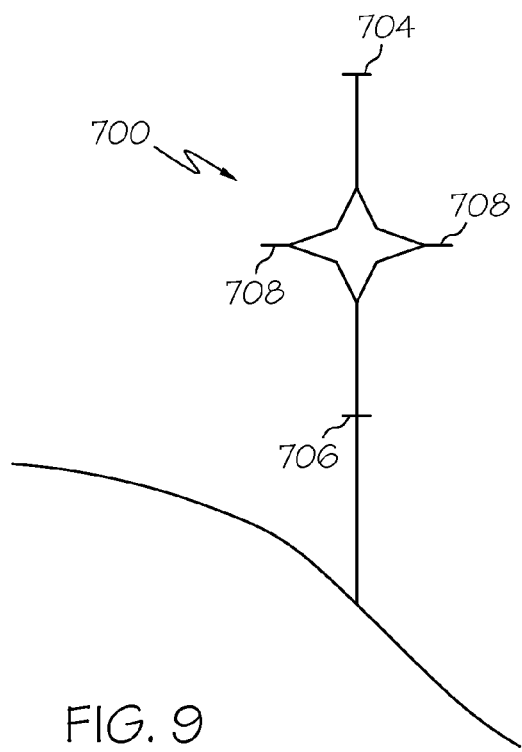
FIG. 9 is a schematic representation of the waypoint marker shown in FIG. 8, as viewed when the aircraft is relatively close to the waypoint.

FIG. 8 is a schematic representation of a waypoint marker 700 associated with a between constraint, as viewed when the aircraft is relatively far away from the waypoint, and FIG. 9 is a schematic representation of waypoint marker 700, as viewed when the aircraft is relatively close to the waypoint. Waypoint marker 700 generally includes, without limitation: a primary icon 702 that represents the waypoint; an upper altitude bar 704 that represents the upper altitude limit or constraint corresponding to the between constraint; and a lower altitude bar 706 that represents the lower altitude limit or constraint corresponding to the between constraint. Waypoint marker 700 may also include a nominal altitude bar 708 that is displayed near or with primary icon 702. Nominal altitude bar 708 may be indicative of the designated altitude of the waypoint and/or the midpoint of the altitude range designated by the between constraint. In some embodiments, the upper, lower, and/or nominal altitudes can be displayed in numerical form at or near the respective altitude bars.

In an alternate embodiment, a waypoint marker can indicate a between constraint using any two altitude bars (or any two visible features). For example, upper altitude bar 704 and altitude bar 708 can be rendered without lower altitude bar 706, while still conveying that waypoint marker 700 is associated with a between constraint. In such an embodiment, altitude bar 708 could instead be displayed at a virtual height that corresponds to the lower altitude limit. Similarly, lower altitude bar 706 and altitude bar 708 can be rendered without upper altitude bar 704. In such an embodiment, altitude bar 708 could be displayed at a virtual height that corresponds to the upper altitude limit.

One or more of the altitude bars of waypoint marker 700 may be suitably rendered in a dynamic manner that accurately reflects the upper altitude limit and/or the lower altitude limit in response to the current position of the aircraft. For example, FIG. 8 depicts waypoint marker 700 as rendered when the aircraft is relatively far from the waypoint. Thus, the virtual distance between upper altitude bar 704 and lower altitude bar 706 is scaled appropriately and waypoint marker 700 is displayed with relatively little space between upper altitude bar 704 and lower altitude bar 706. In contrast, FIG. 9 depicts waypoint marker 700 as rendered when the aircraft is relatively close to the waypoint. Thus, the virtual distance between upper altitude bar 704 and lower altitude bar 706 is scaled appropriately and waypoint marker 700 is displayed with more space between upper altitude bar 704 and lower altitude bar 706. If the scaling of waypoint marker 700 causes some features (e.g., an altitude bar) to migrate beyond the area of the screen, then the system could force those features to remain displayed on the screen, along with some indication that the display is no longer conformal. For example, upper altitude bar 704 might be pinned near the top of the display and rendered using a dashed line rather than a solid line to indicate that it's scaled position would actually be off-screen.

A waypoint marker for a specified altitude constraint can be rendered as depicted in any of FIGS. 6-9, but with certain display characteristics that distinguish it from the other types of waypoint markers. For example, a waypoint marker for a specified or target altitude need not include any altitude bars. As another example, such a waypoint marker need not be divided into different visually distinguishable regions. Indeed, a waypoint marker for a target altitude may simply include a primary icon rendered in a virtual manner at the target altitude. In practice, the primary icon for such a waypoint marker may be rendered in a visibly distinct manner relative to the primary icons for other types of waypoint markers, using any of the visually distinguishable characteristics mentioned above.

Additional information associated with a given waypoint may be conveyed along with its associated waypoint marker. For example, if a waypoint corresponds to the initial approach fix for the aircraft, then the label "IAF" may be rendered with or near the corresponding waypoint marker. Similar labels can be displayed for the final approach fix ("FAF") and for a missed approach point ("MAP"). As another example, an appropriate icon could be displayed with or near the waypoint marker to indicate the glideslope intercept. This icon may depict, for example, a lightning bolt with an arrowhead.

As an added feature, the flight deck display system may display with or near a waypoint marker an indicator, scale, value, or notification that directs the pilot toward the next approaching waypoint. For example, the waypoint marker may include some indicia of the current rate of descent/ascent on a relatively compact scale, along with some indicia of a target rate that must be achieved (or maintained) in order for the aircraft to meet the next altitude constraint. This indicia may be a simple trend indicator having a variable length (where longer corresponds to a higher rate of descent/ascent, and where shorter corresponds to a lower rate of descent/ascent), or a target marker rendered on a scale.

The appearance of a waypoint marker may change when the geographic position of the aircraft is within close proximity to the immediately approaching geographical waypoint. This may be desirable to provide an early warning or notification to the pilot. Moreover, the appearance of a waypoint marker may change when the aircraft passes the targeted geographical waypoint, regardless of whether the auto pilot feature is active. Such a change in appearance will convey to the pilot that the current geographic position of the aircraft is beyond the geographic position of certain waypoints. In yet other embodiments, the appearance of a waypoint marker may change if the currently projected path of the aircraft does not satisfy the altitude restriction corresponding to the approaching waypoint. For example, if the system determines that the current flight profile and projected path will result in a violation of an altitude restriction at the approaching waypoint, then the waypoint marker for that particular waypoint may change to notify the pilot (e.g., it might change color, begin to flash on and off, or the like).

Although the exemplary embodiment described above relates to altitude constraint data rendered with waypoint markers, a flight deck system may also be configured to process other types of aircraft operating parameters, aircraft instrument data, avionics data, status conditions, or the like. For example, a waypoint marker could be suitably formatted and rendered to convey airspeed constraint information that might apply to the related waypoint. Accordingly, if a waypoint has a governing upper airspeed limit, lower airspeed limit, target airspeed, or target airspeed range, then the corresponding waypoint marker could be rendered using visually distinguishable characteristics that indicate the type of airspeed constraint.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A flight deck display system for an aircraft, the system comprising:
   a processor architecture configured to receive waypoint location data for waypoints, terrain data, aircraft geographic position data for the aircraft, and restriction data including a plurality of different types of altitude constraints for the different waypoints, and the processor architecture being configured to generate image rendering display commands based upon the waypoint location data, the terrain data, the restriction data, and the aircraft geographic position data; and
   a display element configured to receive the image rendering display commands and, in response thereto, to render a perspective view of terrain corresponding to a flight deck viewpoint, to dynamically refresh the perspective view based on a current flight status, and to render a waypoint marker in the perspective view of terrain, the waypoint marker corresponding to an approaching waypoint in a flight plan, the waypoint marker comprising:
- a primary icon representing the waypoint;
- a first altitude bar indicative of the one of the plurality of different types of altitude constraints associated with the waypoint, wherein the perspective view, the primary icon, and the first altitude bar are rendered in a conformal manner relative to the earth;
- a second altitude bar indicative of the one of the plurality of types of altitude constraints associated with the waypoint, wherein the second altitude bar is rendered in a conformal manner relative to the earth; and
- a third altitude bar disposed between the first altitude bar and the second altitude bar, wherein the third altitude bar is rendered in a conformal manner relative to the earth;
- the primary icon having one of a plurality of visually distinguishable characteristics, the one of the plurality of visually distinguishable characteristics corresponding with the one of the plurality of types of altitude constraints to visually indicate the one of the plurality of types of altitude constraints;
- wherein the first altitude bar represents an upper altitude limit of the waypoint;
- wherein the second altitude bar represents a lower altitude limit of the waypoint; and
- wherein the third altitude bar represents a nominal altitude of the waypoint.

2. The flight deck display system of claim 1, wherein the appearance of the waypoint marker changes if a projected path of the aircraft does not satisfy the first altitude constraint.

3. The flight deck display system of claim 1, wherein the processor architecture is configured to generate the image rendering display commands by selecting the visually distinguishable characteristic for the primary icon from the plurality of visually distinguishable characteristics according to the one of the plurality of different types of altitude constraints associated with the waypoint.

4. The flight deck display system of claim 1, wherein each of the plurality of visually distinguishable characteristics has at least one difference from the others; and
   wherein the difference is chosen from a group consisting of different color, different brightness, different transparency level, different translucency level, different line pattern, different line thickness, different shape, different size, different flicker pattern, different focus level, different sharpness level, different clarity level, and different orientation.

5. The flight deck display system of claim 1, wherein the display element, in response to the image rendering display commands, is configured to dynamically refresh the perspective view by scaling a virtual space between the first altitude bar and the second altitude bar based on an actual distance between the aircraft and the waypoint.

* * * * *